(12) United States Patent
Bahrami et al.

(10) Patent No.: US 10,915,594 B2
(45) Date of Patent: Feb. 9, 2021

(54) ASSOCIATING DOCUMENTS WITH APPLICATION PROGRAMMING INTERFACES

(71) Applicant: FUJITSU LIMITED, Kawasaki (JP)

(72) Inventors: Mehdi Bahrami, Santa Clara, CA (US); Sarthak Arora, Los Angeles, CA (US); Wei-Peng Chen, Fremont, CA (US)

(73) Assignee: FUJITSU LIMITED, Kawasaki (JP)

( * ) Notice: Subject to any disclaimer, the term of this patent is extended or adjusted under 35 U.S.C. 154(b) by 290 days.

(21) Appl. No.: 16/166,559

(22) Filed: Oct. 22, 2018

(65) Prior Publication Data

US 2020/0125682 A1 Apr. 23, 2020

(51) Int. Cl.
| | |
|---|---|
| *G06F 7/00* | (2006.01) |
| *G06F 16/955* | (2019.01) |
| *G06F 17/15* | (2006.01) |
| *G06F 9/54* | (2006.01) |
| *G06F 16/93* | (2019.01) |

(52) U.S. Cl.
CPC ............ *G06F 16/955* (2019.01); *G06F 9/54* (2013.01); *G06F 16/93* (2019.01); *G06F 17/15* (2013.01)

(58) Field of Classification Search
CPC .......... G06F 16/955; G06F 16/93; G06F 9/54
See application file for complete search history.

(56) References Cited

U.S. PATENT DOCUMENTS

| | | | | |
|---|---|---|---|---|
| 7,730,499 B2 * | 6/2010 | Olson | ................. | G06F 9/541 |
| | | | | 719/328 |
| 9,762,532 B2 * | 9/2017 | Kuusisaari | .............. | H04L 45/02 |
| 9,986,020 B2 | 5/2018 | Yunten | | |
| 10,110,488 B2 * | 10/2018 | Buesker | .................. | H04L 69/22 |
| 10,437,712 B1 * | 10/2019 | Tyler | .................... | G06F 11/3684 |
| 2004/0167961 A1 * | 8/2004 | Jain | ..................... | G06F 16/9574 |
| | | | | 709/203 |
| 2018/0041604 A1 * | 2/2018 | Poblete | ............... | H04L 67/2833 |
| 2018/0145908 A1 * | 5/2018 | Fox | ....................... | H04L 45/306 |

* cited by examiner

*Primary Examiner* — Azam M Cheema
(74) *Attorney, Agent, or Firm* — Maschoff Brennan

(57) ABSTRACT

According to an aspect of an embodiment, a method may include obtaining a first document associated with a particular API and a first Uniform Resource Identifier (URI), a second document associated with the particular API and a second URI, and an API name of the particular API. The method may further include identifying a URI prefix included in the first URI and the second URI. The method may further include determining a correlation between the URI prefix and the API name. The method may further include determining that the URI prefix is associated with the particular API based on the correlation. The method may further include associating the first document and the second document with the particular API based on the first URI and the second URI including the URI prefix and based on determining that the URI prefix is associated with the particular API.

20 Claims, 5 Drawing Sheets

ASSOCIATING DOCUMENTS WITH APPLICATION PROGRAMMING INTERFACES

FIELD

The embodiments discussed in the present disclosure are related to associating documents with application programming interfaces.

BACKGROUND

Application programming interfaces (APIs) include communication protocols that define methods of communication with software components. APIs help software developers to use software components together to perform a function. Many APIs have documentation that pertains to the APIs that describes the APIs. Documentation for an API can help a software developer to understand and use the API and/or the software components of the API.

SUMMARY

According to an aspect of an embodiment, a method of associating documents with Application Programming Interfaces (APIs) may include obtaining a first document associated with a particular API and a first Uniform Resource Identifier (URI). The method may further include obtaining a second document associated with the particular API and a second URI. The method may further include identifying a URI prefix included in the first URI and the second URI. The method may further include obtaining an API name of the particular API. The method may further include determining a correlation between the URI prefix and the API name. The method may further include determining that the URI prefix is associated with the particular API based on the correlation. The method may further include associating the first document and the second document with the particular API based on the first URI and the second URI including the URI prefix and based on determining that the URI prefix is associated with the particular API.

The object and/or advantages of the embodiments will be realized or achieved at least by the elements, features, and combinations particularly pointed out in the claims.

It is to be understood that both the foregoing general description and the following detailed description are given as examples and explanatory and are not restrictive of the present disclosure, as claimed.

BRIEF DESCRIPTION OF THE DRAWINGS

Example embodiments will be described and explained with additional specificity and detail through the use of the accompanying drawings in which.

DESCRIPTION OF EMBODIMENTS

Systems and methods related to associating documents with application programming interfaces (APIs) are disclosed in the present disclosure.

An API of a software component may include defined methods of communication with the software component. APIs enable software developers to use various software components together to perform a function. For example, a travel website may use an API of an airline database to obtain information from the airline database.

To use a particular software component, it may be useful for a software developer to have documentation that describes an API of the particular software component. For example, documentation for an API may describe inputs, outputs, and functions of a particular software component.

Documentation for APIs can be found in various locations, for example, on the Internet. In some instances, documents related to APIs may be found by crawling the Internet, for example using a web-crawler. For example, a web-crawler may gather, from the Internet, multiple documents that may be variously related to multiple different APIs. However, many times documents that pertain at least mostly to a particular API may reference other APIs in a manner that makes it difficult for web-crawlers or other API documentation identifiers to identify to which APIs particular documents may pertain.

The present disclosure may include systems and methods that may identify to which APIs particular documents may pertain. In particular, one or more operations related to the present disclosure may include obtaining multiple documents that may be variously associated with multiple APIs. Each document of the multiple documents may be associated with a Uniform Resource Identifier (URI). The operations of the present disclosure may further include obtaining multiple URIs associated with the multiple documents and identifying multiple URI prefixes that are included in one or more URIs of the multiple URIs.

The operations of the present disclosure may further include determining a correlation between a particular URI prefix and an API name of a particular API and associating the particular URI prefix with the particular API. The operations of the present disclosure may further include associating a particular document with the particular API based on a particular URI of the particular document including the particular URI prefix. The operations of the present disclosure may further include variously associating two or more of the multiple documents gathered from the Internet with multiple different APIs.

Figure 1:
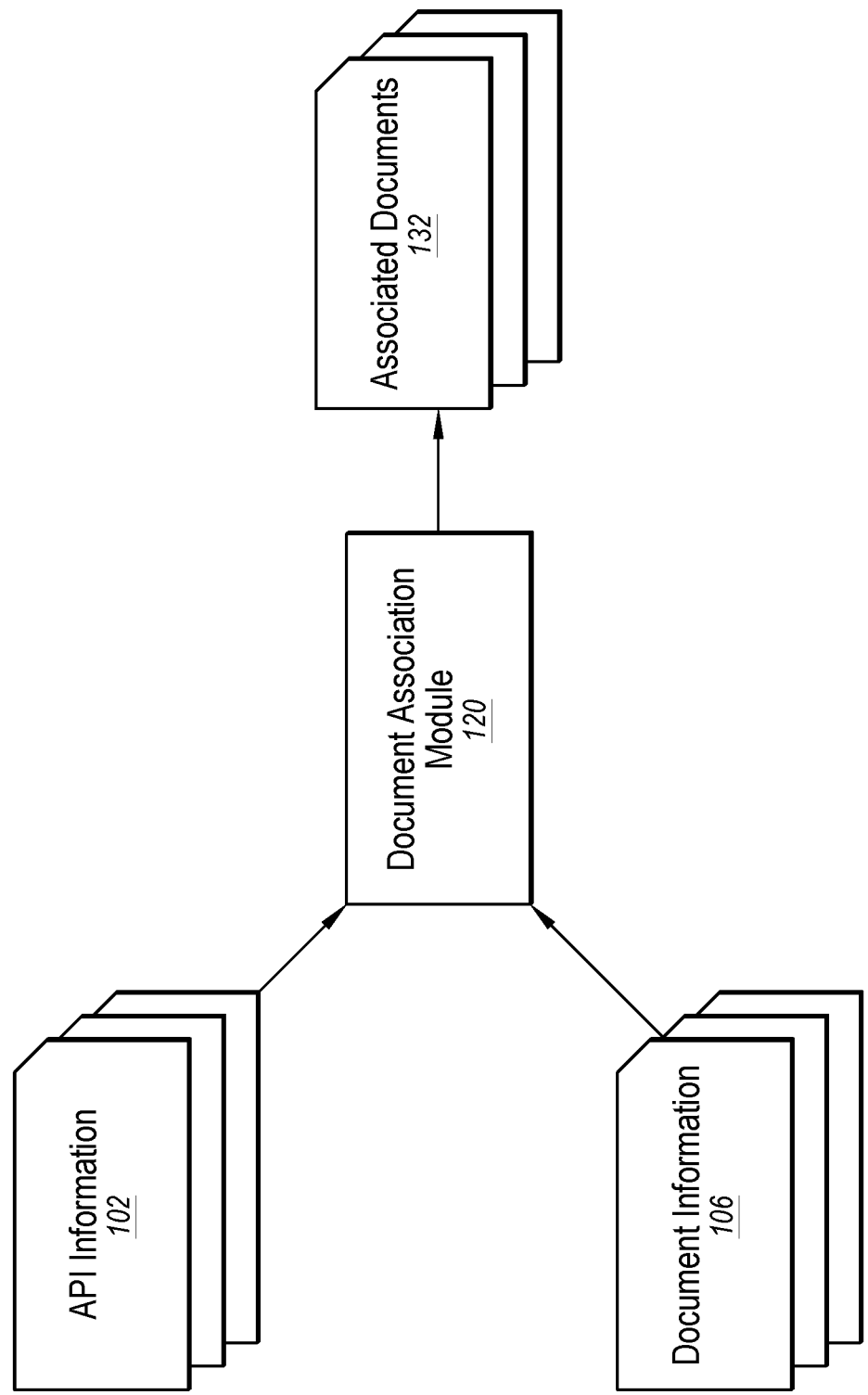
FIG. 1 is a block diagram of an example document association module configured to associate documents with application programming interfaces (APIs)

The systems and methods of the present disclosure may include an improvement in the functioning of a computer in that the systems and methods of the present disclosure may allow a computer to perform a function not previously performed by a computer. For example, the systems and methods of the present disclosure may allow a computer to identify one or more documents that may pertain to an API. In contrast, some other techniques for identifying documents pertaining to an API may require a human to understand an API and one or more documents and identify an association based on the human's understanding. Additionally, the systems and methods of the present disclosure may include an improvement in computer-related technology. For example, the systems and methods of the present disclosure may allow a computer to more efficiently or accurately identify one or more documents that pertain to an API or classify documents FIG. 1 is a block diagram of an example system 100 that includes a document association module 120 configured to associate documents with APIs according to at least one embodiment described in this disclosure. In general, the document association module 120 may associate documents, which may be included in document information 106 of the system 100, with APIs which may be included in API information 102 of the system 100. The association may be used to obtain associated documents 132.

In some embodiments the document association module 120 may include code and routines configured to enable a computing system to perform one or more operations to generate an abstract code graph. Additionally or alternatively, the document association module 120 may be implemented using hardware including a processor, a microprocessor (e.g., to perform or control performance of one or more operations), a field-programmable gate array (FPGA), or an application-specific integrated circuit (ASIC). In some other instances, the document association module 120 may be implemented using a combination of hardware and software. In the present disclosure, operations described as being performed by the document association module 120 may include operations that the document association module 120 may direct a system to perform.

In some embodiments, the API information 102 may include APIs, names of APIs, and/or information about APIs.

In some embodiments, the document information 106 may include documents, Uniform Resource Identifiers (URIs), and information pertaining to the documents. The documents may be in any suitable format, for example, hypertext markup language (HTML), portable document format (PDF), or text file (.txt). The URIs may include strings of characters identifying a resource, for example, a Uniform Resource Locators (URLs). The information pertaining to the documents may include metadata, or information pertaining to the location where the documents were found, for example, a title of a webpage or metadata pertaining to the webpage.

In some embodiments, the document association module 120 may be configured to associate one or more documents of the document information 106 with one or more of the APIs of the API information 102. Descriptions of operations related to associating documents of the document information 106 with APIs of the API information 102 may be included below with regard to the description of flow 200 of FIG. 2A.

In some embodiments, the associated documents 132 may include documents associated with APIs. The associated documents 132 may include documents that each include an association to a particular API, as determined by the document association module 120. The document association module 120 may organize the documents into a file structure according to APIs to which they are associated. Additionally or alternatively, the document association module 120 may generate metadata for the documents that associates the documents with APIs to which they are associated. Additionally or alternatively, the document association module 120 may generate a mapping relating documents to APIs with or without including the documents.

Modifications, additions, or omissions may be made to the system 100 without departing from the scope of the present disclosure. For example, in some embodiments the API information may include only names of APIs, or may relate to only one API. As another example, the document information 106 may include URIs of documents without including documents. Further, the order of operations may vary according to different implementations.

Figure 2A:
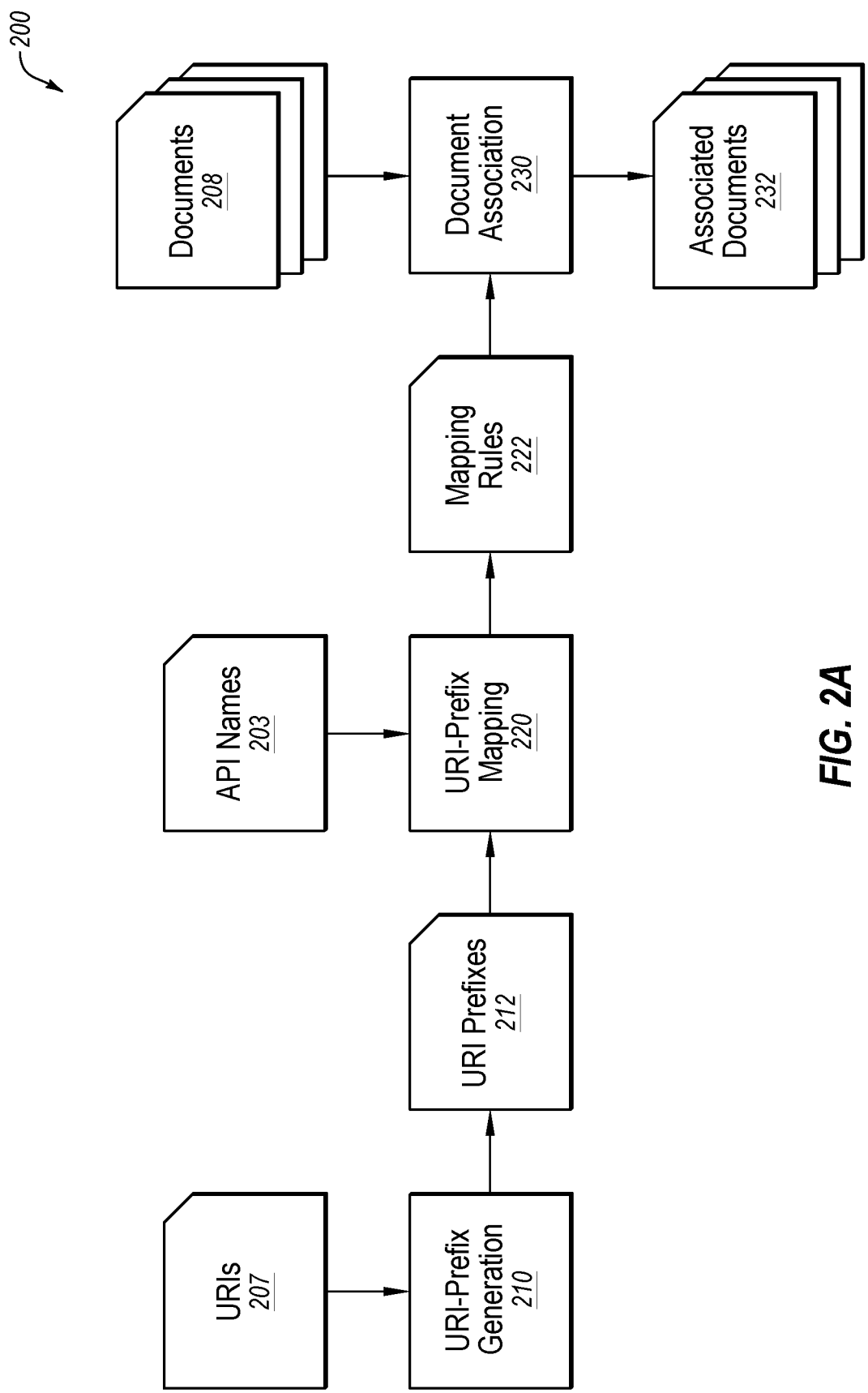
FIG. 2A is a block diagram of an example flow that may be configured to associated documents with APIs.

FIG. 2A is a block diagram of an example flow 200 that may be configured to associate documents with APIs according to at least one embodiment described in this disclosure. In general, the flow 200 may include the obtaining of API names 203, URIs 207, and documents 208. The flow 200 may include operations that may associate one or more of the documents 208 with one or more of the API names 203. The association may be used to obtain associated documents 232.

In some embodiments, the API names 203 may include names of one or more APIs. The API names 203 may be similar to, or the same as information included in the API information 102 of FIG. 1.

In some embodiments, the documents 208 may include one or more documents that may pertain to one or more APIs. The documents 208 may have been gathered from one or more computers, for example, the Internet or an intranet, for example, by a web-crawler. The documents 208 may include URIs from which the documents 208 were obtained or where the documents 208 may be located. The documents 208 may be similar to, or the same as documents included in the document information 106 of FIG. 1.

In some embodiments, the URIs 207 may include character strings indicative of a location from which each of the documents 208 were obtained or where the documents 208 may be located. Each of the documents 208 may have been obtained from a location indicated by one of the URIs 207. For example, a document called "api_events.html" may be located at a URL "https://test.fujitsu.com/api/events/". The URIs 207 may be similar to or the same as information included in the document information 106 of FIG. 1.

In some embodiments, the flow 200 may include URI-prefix generation 210. At the URI-prefix generation 210 one or more of the URIs 207 may be analyzed to determine URI prefixes 212. The URI prefixes 212 may include a portion of one or more URIs 207. In some embodiments, two or more of the URIs 207 may be analyzed to common portions shared between two or more of the URIs 207. For example, a first document 208 "overview" may be located at a first URI, "https://test.fujitsu.com/api/events/overview" and a second document 208 "rest_api" may be located at a second URI "https://test.fujitsu.com/api/events/rest_api" The first URI and the second URI may have in common the portion "https://test.fujitsu.com/api/events/" which may be a URI prefix 212. As another example, a first URI, "https://test.fujitsu.com/api/v1/events" and a second URI "https://test.fujitsu.com/api/v2/events" may have a common portion "https://test.fujitsu.com/api/" which may be a URI prefix 212.

In some embodiments, at the URI-prefix generation 210 a document-title portion of one or more of the URIs 207 may be removed from the URIs 207. For example, a URI "https://api.fujitsu.com/scanner/v1/" may be truncated to "https://api.fujitsu.com/scanner/". Additionally or alternatively, a scheme or protocol portion of one of more of the URIs 207 may be removed from the URIs 207. For example, a URI "https://api.fujitsu.com/scanner/v1/" may be truncated to "api.fujitsu.com/scanner/".

In some embodiments, at the URI-prefix generation 210, the URI prefixes 212 may be sorted according to a number of URIs 207 which include each of the URI prefixes 212. For example, a particular URI prefix that is included in more URIs than any other URI prefix may be ordered first in the URI prefixes 212.

In some embodiments, the flow 200 may include URI-prefix mapping 220. At the URI-prefix mapping 220 one or more URI prefixes 212 may be associated with one or more API names 203. In some instances, each of the URI prefixes 212 may be associated with one of the API names 203. In general, the URI-prefix mapping 220 may include comparing the API names 203 with the URI prefixes 212 and determining a correlation between one or more API names 203 and one or more URI prefixes 212. One or more examples of the comparing and determining a correlation between the API names 203 with the URI prefixes 212 are more fully described below with regard to operations associated with flow 201 of FIG. 2B.

In some embodiments, the operations of the URI-prefix mapping 220 may generate mapping rules 222. The mapping rules 222 may include associations between one or more API names 203 and one or more URI prefixes 212. In some instances, the mapping rules 222 may include a many-to-one mapping, associating multiple URI prefixes 212 with a one API name 203. In these or other instances, the mapping rules 222 may include a many-to-many mapping, associating some of the URI prefixes 212 with more than one API name 203. The determining of the mapping rules 222 may be based on the determined correlation between the API names 203 with the URI prefixes 212. In some embodiments, the determining of the mapping rules 222 may be based on one or more operations described below with respect to the flow 201 of FIG. 2B.

In some embodiments, the flow 200 may include document association 230. At the document association 230, one or more documents 208 may be associated with one or more API names 203 based on the mapping rules 222. For example, the documents 208 may include URIs from which the documents 208 were obtained. Additionally, as indicated above, the mapping rules 222 may include associations between URI prefixes 212 and API names 203. The documents 208 may be associated with API names 203 according to the URIs from which they were obtained and the mapping rules 222.

For example, the mapping rules 222 may include an association between the URI prefix "https://api.fujitsu.com/scanner/v1/" and the API name "Scanner API." At the document association 230, a document obtained from the URL "https://api.fujitsu.com/scanner/v1/docs.html" may be associated with the API "Scanner API" based on the URL from which the document was obtained including the URI prefix "https://api.fujitsu.com/scanner/v1/" and the association in the mapping rules 222 between the URI prefix "https://apifujitsu.com/scanner/v1/" and the API name "Scanner API."

In some embodiments the document association 230 may include changing associations between documents 208 and API names 203. For example, the document association 230 may include disassociating a particular document from a first API name and associating the particular document with a second API name. For instance a particular document 208 may be associated with a particular API name 203 when the document is obtained, for example a web-crawler may associate the particular document 208 with the particular API name 203 when the particular document 208 is obtained. The mapping rules 222 may indicate that the particular document 208 is associated with a different API name 203. The document association 230 may disassociate the particular document 208 from the particular API name 203 and associate the particular document 208 with the different API name 203.

In some embodiments, the associated documents 232 may be the same as or similar to the associated documents 132 of FIG. 1.

Modifications, additions, or omissions may be made to the flow 200 without departing from the scope of the present disclosure. For example, the URIs 207 may be provided to the document association 230 or the documents 208 may be provided to the URI-prefix generation 210. For another example, a web-crawler may use mapping rules 222 that may have been generated previously to perform document association 230 on documents 208 as the documents 208 are being gathered. Further, the order of operations may vary according to different implementations.

Figure 2B:
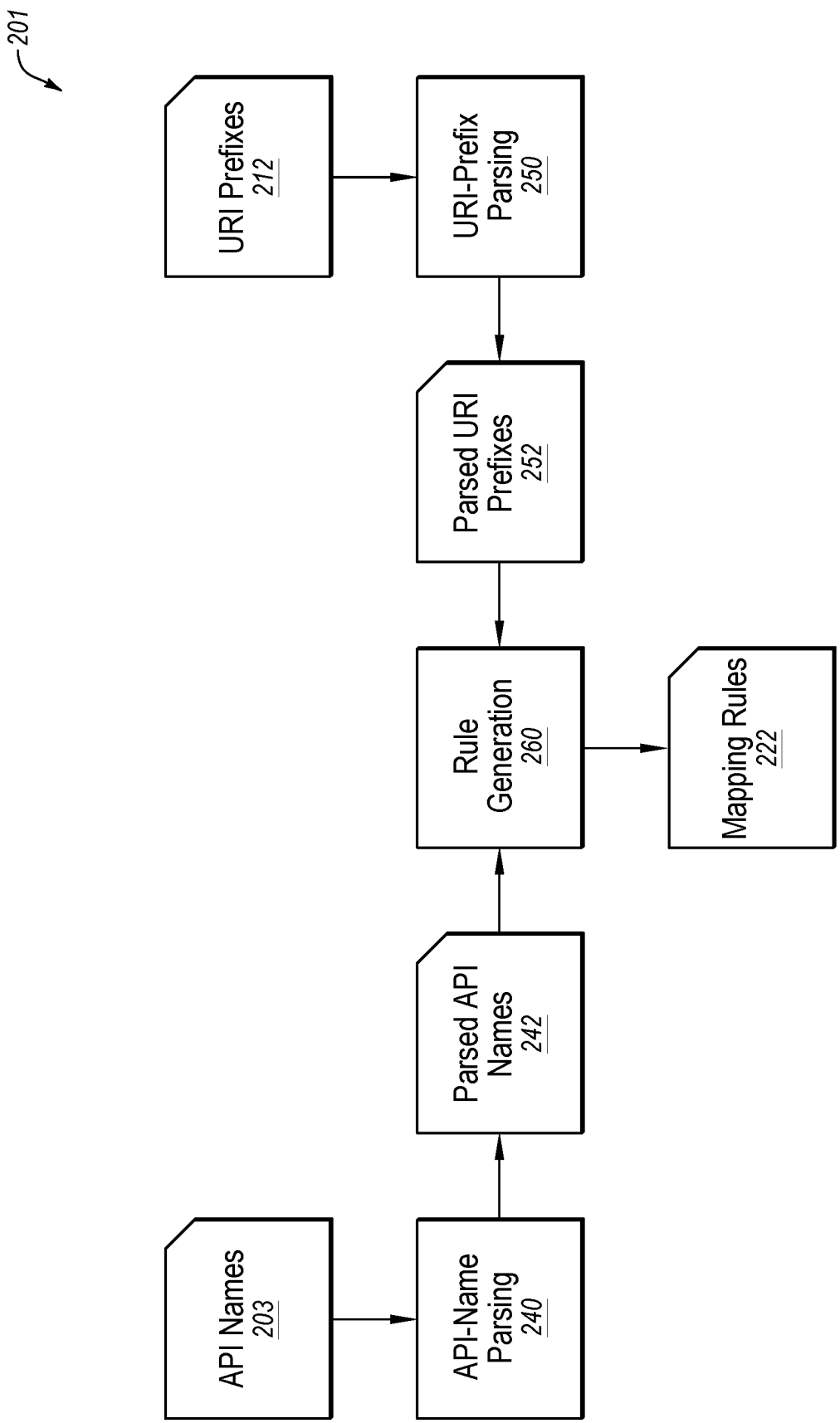
FIG. 2B is a block diagram of an example flow that may be configured to generate rules that may be used to associate documents with APIs.

FIG. 2B is a block diagram of an example flow 201 that may be configured to generate rules that may be used to associate documents with APIs according to at least one embodiment described in this disclosure. In general, the flow 201 may include obtaining API names 203 and URI prefixes 212 and generating mapping rules 222 that include associations between the API names 203 and the URI prefixes 212.

The API names 203 of FIG. 2B may be the same as or similar to the API names 203 of FIG. 2A. Likewise, The URI prefixes of FIG. 2B may be the same as or similar to the URI prefixes 212 of FIG. 2A. Likewise, the mapping rules 222 of FIG. 2B may be the same as or similar to the mapping rules 222 of FIG. 2A.

In some embodiments, the flow 201 may include API-Name parsing 240. At the API-Name parsing 240, the API names 203 may be edited to remove one or more characters. For example, special characters such as "/," ">," and "." may be removed from the API names 203. Additionally or alternatively, the other characters such as "API," and "fujitsu," may be removed from the API names 203. Any characters removed from the API names 203 may be removed for not providing useful or distinguishing information.

In some embodiments, at the API-Name parsing 240, the API names 203 may be tokenized. For example, one or more words may be identified from the API names 203, the words may be labeled as tokens.

In some embodiments, the operations of the API-Name parsing 240 may generate parsed API names 242. The parsed API names 242 may include one or more tokens representing each of the API names 203.

In some embodiments the flow 201 may include URI-prefix parsing 250. At the URI-prefix parsing 250, the URI prefixes 212 may be parsed in a manner similar to what was accomplished at the API-Name parsing 240. For example, at the URI-prefix parsing 250, the URI prefixes 212 may have one or more characters removed, including characters such as "/," "." "API," "www," and ".com" and the URI prefixes 212 may be tokenized.

In some embodiments, the operations of the URI-prefix parsing 250 may generate parsed URI prefixes 252. The parsed URI prefixes 252 may include one or more tokens representing each of the URI prefixes 212.

In some embodiments, the flow 201 may include rule generation 260. In general, at the rule generation 260 the parsed API names 242 may be compared with the parsed URI prefixes 252. Correlations between the parsed API names 242 and the parsed URI prefixes 252 may be identified. Based on the correlations, the mapping rules 222 may be generated to include associations between one or more of the parsed URI prefixes 252 and one or more of the parsed API names 242. Because of the relationship between the API names 203 and the parsed API names 242, and the relationship between the URI prefixes 212 and the parsed URI prefixes 252, the mapping rules 222 may also implicitly or explicitly include relationships between the API names 203 and the URI prefixes 212.

In some embodiments, the rule generation 260 may include determining a correlation between the parsed API names 242 and the parsed URI prefixes 252 based on a number of common token considerations. The common token considerations may include a number of common tokens, a number of common consecutive tokens, and a number of differences between the parsed URI prefixes 252 and the parsed API names 242. When identifying correlations between the parsed URI prefixes 252 and the parsed API names 242 the common token considerations may be considered individually or severally, and in any order. For example, more stringent common token considerations may be considered first.

In some embodiments, parsed API names 242 may be associated with specific parsed URI prefixes 252 in the mapping rules 222 in response to the corresponding correlations satisfying a correlation threshold ("correlation threshold"). The correlation threshold may vary according to the common consideration token being considered. Additionally or alternatively, the correlation threshold may be modified in response to the correlation threshold not being satisfied by one or more correlations between parsed URI prefixes 252 and parsed API names 242.

For example, one common token consideration may be a number of common tokens between the parsed API names 242 and the parsed URI prefixes 252. In these or other embodiments, the correlation threshold may include a threshold number or threshold percentage of common tokens between the parsed API names 242 and the parsed URI prefixes 252. For example if a parsed API name 242 contains four tokens, a parsed URI prefix 252 that contains three tokens in common with the parsed API name 242 would satisfy a correlation threshold of "three common tokens" or "greater than fifty percent common tokens."

The correlation threshold may be determined a priori, heuristically, and/or adjusted based on results of the correlation. Additionally or alternatively, the correlation threshold may include or be based on a comparison to other correlations. For example the threshold may be determined based on a number of comparisons between one or more parsed API names 242 and one or more parsed URI prefixes 252. For instance, a parsed API name 242 may be compared with one hundred parsed URI prefixes 252. The threshold may be set such that the ten percent of the parsed URI prefixes 252 that have the most common tokens with the parsed API name 242 satisfy the threshold.

For example, the correlation threshold may be that a parsed URI prefix 252 may be associated with a parsed API name 242 in response to the parsed URI prefix 252 including three or more tokens that are also included in the parsed API name 242. Then, for instance, in response to a particular parsed URI prefix 252 including four tokens that are also included in a first parsed API name 242, the particular URI prefix 252 may be associated with the first API name 242 in the mapping rules 222. And, for instance, in response to the particular parsed URI prefix 252 including only two tokens that are also included in a second parsed API name 242, the particular URI prefix 252 may not be associated with the second parsed API name 242 in the mapping rules 222. As another example, the correlation threshold may be that a parsed URI prefix 252 may be associated with a parsed API name 242 in response to the parsed URI prefix 252 including 50% of the tokens that are also included in the parsed API name.

As another example the correlation threshold may be that a parsed URI prefix 252 may be associated with a parsed API name 242 in response to the parsed URI prefix 252 being more correlated to the parsed API name 242 than the parsed URI prefix 252 is to any other parsed API name 242.

Another of the common token considerations may be a number of consecutive common tokens between the parsed API names 242 and the parsed URI prefixes 252. The number of consecutive common tokens may be substantially similar to what was described above with regard to the number of common tokens with the exception that the tokens appear in the same order, without intervening tokens, in the parsed API name 242, or API name 203, as the parsed URI prefix 252, or the URI prefix 212, to be counted in the number of consecutive common token. Additionally or alternatively, the correlation threshold for the number of consecutive common tokens may be lower than the correlation threshold for the number of common tokens. This may be because the number of consecutive common tokens may be a more stringent common token consideration than the number of common tokens.

Another of the common token considerations may be a number of differences between the parsed API names 242 and the parsed URI prefixes 252. The differences may include a minimum number of edits that could be made to the characters of a particular parsed API name 242 so that the characters match the characters of a particular parsed URI prefix 252. The correlation threshold for the number of differences between the parsed API names 242 and the parsed URI prefixes 252 may be a number of differences or a percentage or ratio of differences to total character numbers. Additionally or alternatively, the correlation threshold may include a comparison to other correlations.

For example, the correlation threshold may be that a parsed URI prefix 252 may be associated with a parsed API name 242 in response to there being ten or fewer character differences between the parsed URI prefix 252 and the parsed API name 242. For another example, a correlation threshold may be that a parsed URI prefix 252 may be associated with a parsed API name 242 in response to three quarters or more of the characters of the parsed URI prefix 252 and the parsed API name 242 being the same. For another example a correlation threshold may be that a parsed URI prefix 252 may be associated with a parsed API name 242 in response to the parsed URI prefix 252 having fewer differences between the parsed URI prefix 252 and the parsed API name 242 than the parsed URI prefix 252 has to any other parsed API name 242.

In some embodiments, the common token considerations may be ranked in order of relevance in determining a correlation or stringency of the common token consideration. The common token considerations may be considered in order such that in response to a correlation threshold of a first common token consideration being satisfied, a second common token consideration is not be considered. For example, in response to a particular parsed URI prefix 252 including all of the tokens of a particular parsed API name 242 there may be no need to consider how many differences there are between the particular parsed API name 242 and the particular parsed URI prefix 252.

In some embodiments, at the rule generation 260, the highest degree of correlation may be used as the basis for associating URI prefixes 212 with API names 203 in the mapping rules. In these or other embodiments a number of satisfied correlation thresholds or which correlation thresholds are satisfied may be used as the basis for associating URI prefixes 212 with API names 203 in the mapping rules 222. For example, in response to one or more correlation thresholds being satisfied the association may be included in the mapping rules 222. As another example, in response to a particular correlation threshold not being satisfied, the association may not be included in the mapping rules regardless of other common token considerations. For example, despite a number of differences between a particular parsed URI prefix 252 and a particular parsed API name 242 satisfying a correlation threshold, the association may not be included in the mapping rules in response to there being no common tokens between a particular parsed URI prefix 252 and a particular parsed API name 242.

In some embodiments, the correlation thresholds may be modified in response to comparisons between the parsed URI prefixes 252 and the parsed API names 242. For example, in response to a correlation threshold not being satisfied by a particular parsed URI prefix 252 after having been compared with each of the parsed API names 242 the correlation threshold may be modified. For instance, the correlation threshold may be made less stringent and a new comparison based on the less stringent correlation threshold may be undertaken.

In some embodiments, all of the parsed API names 242 may be compared with all of the parsed URI prefixes 252. In these or other embodiments, the parsed API names 242 and/or the parsed URI prefixes 252 may be ordered and the comparison may take place in order. For example, the parsed URI prefixes 252 may be ordered according to a number of URIs that include each of the parsed URI prefixes 252 or the URI prefixes 212 from which the parsed URI prefixes 252 were derived. In some embodiments, after a correlation threshold has been satisfied by a particular parsed URI prefix 252 with any parsed API name 242, the particular parsed URI prefix 252 may not be considered in further comparisons.

In these or other embodiments rule generation 260 may take the order of the parsed URI prefixes 252, or the number of URIs that include the URI prefixes 212, or tokens of each of the parsed URI prefixes into account. For example, a first URI prefix 212 "fujitsu/api/account management" may be included in ten URIs; and a second URI prefix 212 "fujitsu/api/account" may be included in six URIs. The rule generation 260 may be more likely to associate an API "manage account" with the first URI prefix 212 based on the first URI prefix 212 being included in more URIs than the second URI prefix 212.

Additionally or alternatively a purpose of the comparison and correlation may include determining to which API name 203 each of URI prefixes 212 is most closely correlated. In these or other embodiments each of the parsed URI prefixes 252 may be compared with each of the parsed API names 242 according to one or more different common token considerations to determine a degree of correlation. Following the comparison, each of the parsed URI prefixes 252 may be associated with the parsed API name 242 to which it has the highest degree of correlation based on the one or more common token considerations and the corresponding correlation thresholds.

In some embodiments, a particular URI prefix 212 may be associated with multiple API names 203 in the mapping rules 222. Additionally or alternatively, it may be a goal of the flow 201 to associate each URI prefixes 212 with only one API name 203 in the mapping rules 222. In these or other embodiments, any URI prefix 212 that may be associated with more than one API name 203 may be removed from the URI prefixes 212 or the mapping rules 222. For example, because a particular URI prefix, "https://api.fujitsu.com/scanner/v1/," may be associated with more than one API, each of which may be associated with a longer URI prefix 212, which may be associated with a different API, the particular URI prefix may be excluded from the mapping rules 222.

Modifications, additions, or omissions may be made to the flow 201 without departing from the scope of the present disclosure. For example, the rule generation 260 may be split into a comparison step and an association step. Further, the order of operations may vary according to different implementations.

Figure 3:
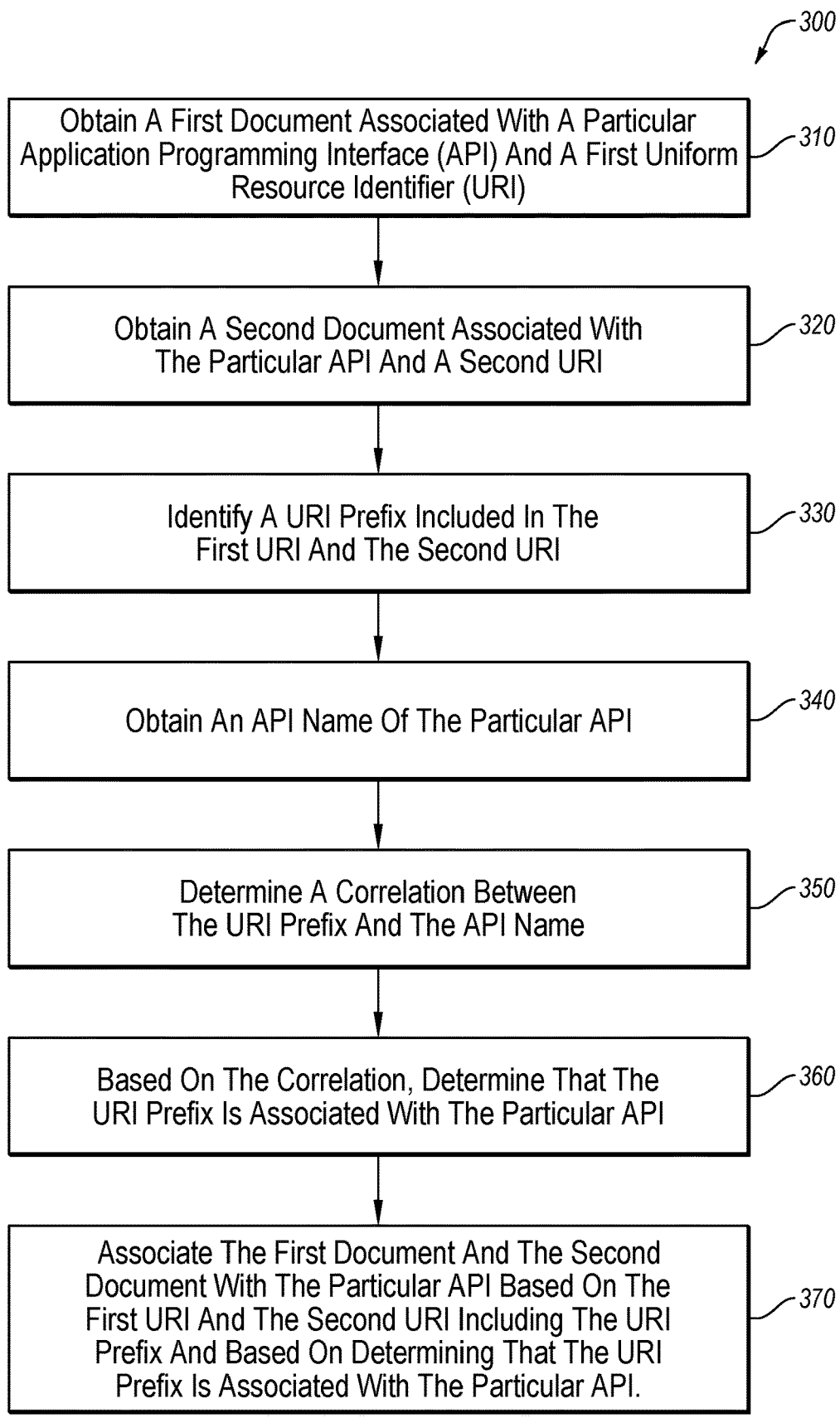
FIG. 3 is a flow chart of an example process for associating documents with APIs.

FIG. 3 is a flow chart of an example method 300 configured to associate documents with APIs, according to at least one embodiment described in this disclosure. In some embodiments, one or more of the operations associated with the method 300 may be performed by the document association module 120 of FIG. 1. The method 300 may be performed by any suitable system, apparatus, or device. For example, the computing system 400 of FIG. 4 may perform one or more of the operations associated with the method 300. Although illustrated with discrete blocks, the steps and operations associated with one or more of the blocks of the method 300 may be divided into additional blocks, combined into fewer blocks, or eliminated, depending on the desired implementation.

The method 300 may begin at block 310. At the block 310 a first document may be obtained. The first document may be associated with a particular API and a first URI.

At block 320, a second document may be obtained. The second document may be associated with the particular API and a second URI.

At block 330, a URI prefix may be identified. The URI prefix may be included in the first URI and the second URI.

In some embodiments, the block 330 may include removing a portion of the first URI and/or the second URI. In these or other embodiments, the block 330 may include identifying the URI prefix by identifying a portion of the first URI that is included in the second URI.

At the block 340, an API name of the particular API may be obtained. At block 350, a correlation between the URI prefix and the API name may be determined. In some embodiments, prior to determining a correlation between the URI prefix and the API name, one or more characters may be removed from the URI prefix and/or the API name. In these or other embodiments, prior to determining a correlation between the URI prefix and the API name, the URI prefix and the API name may be tokenized to generate URI-prefix tokens and API tokens. The determination of the correlation between the URI prefix and the API name may include determining a correlation between one or more of the URI-prefix tokens and one or more of the API tokens.

For example, the one or more URI-prefix tokens and the one or more API tokens may be compared and a correlation may be determined based on one or more common token considerations and a correlation threshold corresponding to each of the common token considerations. The common token considerations may include: a number of common tokens between the API tokens and the URI-prefix tokens, a number of consecutive common tokens between the API tokens and the URI-prefix tokens and a number of differences between one or more of the API tokens and one or more of the URI-prefix tokens. The correlation thresholds may include conditions based on a number, a percentage, or a comparison with other correlations.

At block 360, a determination may be made that the URI prefix is associated with the particular API based on the correlation between the URI prefix and the API name. For example, the determination that the URI prefix is associated with the particular API may be based a correlation exceeding a correlation threshold. For example, the URI prefix may be associated with the particular API based on the URI prefix including three tokens in common with the particular API name where the correlation threshold is represented as "two common tokens." Additionally or alternatively, the determination that the URI prefix is associated with the particular API may be in response to the correlation indicating that a number of differences between the URI prefix and the API name is below a threshold. The block 360 may be followed by block 370.

At the block 370, the first document and the second document may be associated with the particular API based on the first URI and the second URI including the URI prefix and based on the URI prefix being associated with the particular API.

In some embodiments, prior to the block 370, the first document may have been associated with another API. The block 370 may include disassociating the first document from the other API.

In some embodiments, the method 300 may include obtaining a third document that is associated with a third URI. The method 300 may include associating the third document with the particular API based on the third URI including the URI prefix and based on the URI prefix being associated with the particular API.

In some embodiments, the method 300 may include obtaining a fourth document that is associated with a second API and a fourth URI. The method 300 may also include obtaining a fifth document that is associated with the second API and a fifth URI. The method 300 may also include identifying a second URI prefix that is included in the fourth URI and the fifth URI. The method 300 may also include obtaining a second API name of the second API.

The method 300 may also include comparing the second API name to the first URI prefix and determining a first correlation between the second API name and the first URI prefix. The method 300 may also include comparing the second API name to the second URI prefix and determining a second correlation between the second API name and the second URI prefix. The method 300 may also include determining that the second URI prefix is associated with the second API and that the first URI prefix is not associated with the second API based on the first correlation and the second correlation. The method 300 may also include associating the fourth document and the fifth document with the second API based on the fourth URI and the fifth URI including the second URI prefix and based on determining that the second URI prefix is associated with the second API.

In some embodiments, the method 300 may include obtaining multiple URI prefixes, including a third URI prefix. The third URI prefix may be included in the first URI prefix and the second URI prefix. The method 300 may also include comparing a third API name to one or more URI prefixes of the multiple URI prefixes. The method 300 may also include determining not to use the third URI prefix when comparing the third API name to the one or more URI prefixes of the multiple URI prefixes based on the third URI prefix being included in the first URI prefix, which is associated with the first API and the third URI prefix being include in the second URI prefix which is associated with the second API.

In some embodiments, the method 300 may include obtaining multiple URIs. The first URI prefix may be included in a first number of URIs of the multiple URIs. The method 300 may also include obtaining a fourth URI prefix. The fourth URI prefix may be included in a second number of URIs of the multiple URIs. The method 300 may also include, in order to determine the correlation between the API name and the first URI prefix, comparing the API name to the first URI prefix before comparing the API name to the second URI prefix based on the first number being larger than the second number.

Modifications, additions, or omissions may be made to the method 300 without departing from the scope of the present disclosure. Further, the order of operations may vary according to different implementations.

Figure 4:
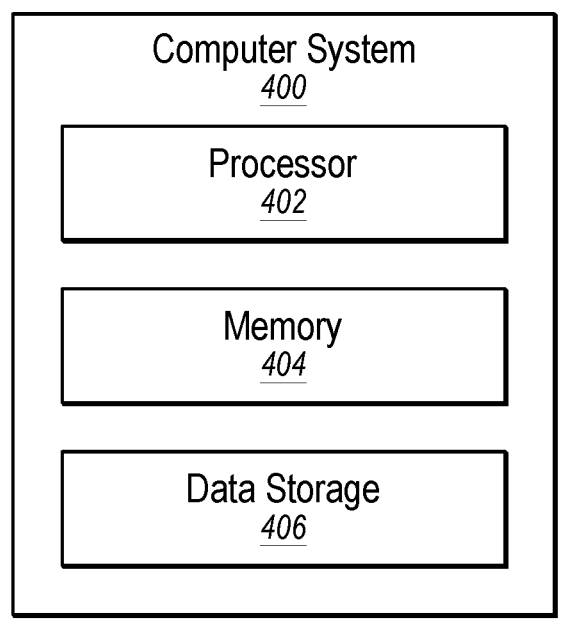
FIG. 4 is a block diagram of an example computing system.

FIG. 4 is a block diagram of an example computing system 400, which may be according to at least one embodiment described in this disclosure. As illustrated in FIG. 4, the computing system 400 may include a processor 402, a memory 404, and a data storage 406.

Generally, the processor 402 may include any suitable special-purpose or general-purpose computer, computing entity, or processing device including various computer hardware or software modules and may be configured to execute instructions stored on any applicable computer-readable storage media. For example, the processor 402 may include a microprocessor, a microcontroller, a digital signal processor (DSP), an application-specific integrated circuit (ASIC), a Field-Programmable Gate Array (FPGA), or any other digital or analog circuitry configured to interpret and/or to execute program instructions and/or to process data. Although illustrated as a single processor in FIG. 4, it is understood that the processor 402 may include any number of processors distributed across any number of network or physical locations that are configured to perform individually or collectively any number of operations described herein. In some embodiments, the processor 402 may interpret and/or execute program instructions and/or process data stored in the memory 404, the data storage 406, or the memory 404 and the data storage 406. In some embodiments, the processor 402 may fetch program instructions from the data storage 406 and load the program instructions in the memory 404. After the program instructions are loaded into the memory 404, the processor 402 may execute the program instructions, such as instructions to perform one or more operations described with respect to the document association module 120, the flows 200 and 201, and/or the method 300 of FIGS. 1, 2A, 2B, and 3, respectively.

The memory 404 and the data storage 406 may include computer-readable storage media or one or more computer-readable storage mediums for carrying or having computer-executable instructions or data structures stored thereon. Such computer-readable storage media may be any available media that may be accessed by a general-purpose or special-purpose computer, such as the processor 402. By way of example, and not limitation, such computer-readable storage media may include non-transitory computer-readable storage media including Random Access Memory (RAM), Read-Only Memory (ROM), Electrically Erasable Programmable Read-Only Memory (EEPROM), Compact Disc Read-Only Memory (CD-ROM) or other optical disk storage, magnetic disk storage or other magnetic storage devices, flash memory devices (e.g., solid state memory devices), or any other storage medium which may be used to carry or store program code in the form of computer-executable instructions or data structures and which may be accessed by a general-purpose or special-purpose computer. Combinations of the above may also be included within the scope of computer-readable storage media. Computer-executable instructions may include, for example, instructions and data configured to cause the processor 402 to perform a certain operation or group of operations. In these and other embodiments, the term "non-transitory" as explained herein should be construed to exclude only those types of transitory media that were found to fall outside the scope of patentable subject matter in the Federal Circuit decision of *In re Nuijten*, 500 F.3d 1346 (Fed. Cir. 2007). Combinations of the above may also be included within the scope of computer-readable media.

Modifications, additions, or omissions may be made to the computing system 400 without departing from the scope of the present disclosure. For example, the data storage 406 may be located in multiple locations and accessed by the processor 402 through a network.

One skilled in the art will appreciate that, for the document association module 120, the method 300 and other processes and methods disclosed herein, the functions performed in the processes and methods may be implemented in differing order. Furthermore, the outlined steps and actions are only provided as examples, and some of the steps and actions may be optional, combined into fewer steps and actions, or expanded into additional steps and actions without detracting from the essence of the disclosed embodiments.

The embodiments described herein may include the use of a special-purpose or general-purpose computer including various computer hardware or software modules, as discussed above. As used herein, the terms "module" or "component" may refer to specific hardware implementations configured to perform the operations of the module or component and/or software objects or software routines that may be stored on and/or executed by general-purpose hardware (e.g., computer-readable media, processing devices, etc.) of the computing system. In some embodiments, the different components, modules, engines, and services described herein may be implemented as objects or processes that execute on the computing system (e.g., as separate threads).

While some of the system and methods described herein are generally described as being implemented in software (stored on and/or executed by general-purpose hardware), specific hardware implementations or a combination of software and specific hardware implementations are also possible and contemplated. In this description, a "computing entity" may be any computing system as previously defined herein, or any module or combination of modulates running on a computing system.

Terms used herein and especially in the appended claims (e.g., bodies of the appended claims) are generally intended as "open" terms (e.g., the term "including" should be interpreted as "including, but not limited to," the term "having" should be interpreted as "having at least," the term "includes" should be interpreted as "includes, but is not limited to," etc.).

Additionally, if a specific number of an introduced claim recitation is intended, such an intent will be explicitly recited in the claim, and in the absence of such recitation no such intent is present. For example, as an aid to understanding, the following appended claims may contain usage of the introductory phrases "at least one" and "one or more" to introduce claim recitations. However, the use of such phrases should not be construed to imply that the introduction of a claim recitation by the indefinite articles "a" or "an" limits any particular claim containing such introduced claim recitation to embodiments containing only one such recitation, even when the same claim includes the introductory phrases "one or more" or "at least one" and indefinite articles such as "a" or "an" (e.g., "a" and/or "an" should be interpreted to mean "at least one" or "one or more"); the same holds true for the use of definite articles used to introduce claim recitations.

In addition, even if a specific number of an introduced claim recitation is explicitly recited, those skilled in the art will recognize that such recitation should be interpreted to mean at least the recited number (e.g., the bare recitation of "two recitations," without other modifiers, means at least two recitations, or two or more recitations). Furthermore, in those instances where a convention analogous to "at least one of A, B, and C, etc." or "one or more of A, B, and C, etc." is used, in general such a construction is intended to include A alone, B alone, C alone, A and B together, A and C together, B and C together, or A, B, and C together, etc. For example, the use of the term "and/or" is intended to be construed in this manner.

Further, any disjunctive word or phrase presenting two or more alternative terms, whether in the description, claims, or drawings, should be understood to contemplate the possibilities of including one of the terms, either of the terms, or both terms. For example, the phrase "A or B" should be understood to include the possibilities of "A" or "B" or "A and B." Additionally, use of the term "and/or" in some places does not mean that the term "or" should be understood to only include either of the terms as opposed to including the possibility of both terms.

Additionally, the use of the terms "first," "second," "third," etc., are not necessarily used herein to connote a specific order or number of elements. Generally, the terms "first," "second," "third," etc., are used to distinguish between different elements as generic identifiers. Absence a showing that the terms "first," "second," "third," etc., connote a specific order, these terms should not be understood to connote a specific order. Furthermore, absence a showing that the terms first," "second," "third," etc., connote a specific number of elements, these terms should not be understood to connote a specific number of elements. For example, a first widget may be described as having a first side and a second widget may be described as having a second side. The use of the term "second side" with respect to the second widget may be to distinguish such side of the second widget from the "first side" of the first widget and not to connote that the second widget has two sides.

All examples and conditional language recited herein are intended for pedagogical objects to aid the reader in understanding the invention and the concepts contributed by the inventor to furthering the art, and are to be construed as being without limitation to such specifically recited examples and conditions. Although embodiments of the present disclosure have been described in detail, it should be understood that the various changes, substitutions, and alterations could be made hereto without departing from the spirit and scope of the present disclosure.

What is claimed is:

1. A method comprising:
   obtaining a first document associated with a particular Application Programming Interface (API) and a first Uniform Resource Identifier (URI);
   obtaining a second document associated with the particular API and a second URI;
   identifying a URI prefix included in the first URI and the second URI;
   obtaining an API name of the particular API;
   determining a correlation between the URI prefix and the API name;
   based on the correlation, determining that the URI prefix is associated with the particular API; and associating the first document and the second document with the particular API based on the first URI and the second URI including the URI prefix and based on determining that the URI prefix is associated with the particular API.

2. The method of claim 1, further comprising:
obtaining a third document associated with a third URI; and
associating the third document with the particular API based on the third URI including the URI prefix and based on the URI prefix being associated with the particular API.

3. The method of claim 1, wherein the particular API is a first API, the API name is a first API name, and the URI prefix is a first URI prefix; the method further comprising:
obtaining a third document associated with a second API and a third URI;
obtaining a fourth document associated with the second API and a fourth URI;
identifying a second URI prefix included in the third URI and the fourth URI;
obtaining a second API name of the second API;
comparing the second API name to the first URI prefix and the second URI prefix;
determining, based on the comparison between the second API name and the first URI prefix, a first correlation between the second API name and the first URI prefix;
determining, based on the comparison between the second API name and the second URI prefix, a second correlation between the second API name and second URI prefix;
based on the first correlation and the second correlation, determining that the second URI prefix is associated with the second API and that the first URI prefix is not associated with the second API; and
associating the third document and the fourth document with the second API based on the third URI and the fourth URI including the second URI prefix and based on determining that the second URI prefix is associated with the second API.

4. The method of claim 3, further comprising:
obtaining a plurality of URI prefixes including a third URI prefix included in the first URI prefix and the second URI prefix;
comparing a third API name to one or more URI prefixes of the plurality of URI prefixes; and
determining not to use the third URI prefix when comparing the third API name to the one or more URI prefixes of the plurality of URI prefixes based on the third URI prefix being included in the first URI prefix, which is associated with the first API, and the third URI prefix being included in the second URI prefix, which is associated with the second API.

5. The method of claim 1, wherein the URI prefix is a first URI prefix; the method further comprising:
obtaining a plurality of URIs, wherein the first URI prefix is included in a first number of URIs of the plurality of URIs;
obtaining a second URI prefix included in a second number of URIs of the plurality of URIs; and
wherein the determining the correlation between the API name and the first URI prefix comprises prioritizing comparing the API name to the first URI prefix or the second URI prefix based on the first number and the second number.

6. The method of claim 1, further comprising:
obtaining API tokens representing the API name; and obtaining URI-prefix tokens representing the URI prefix; and
wherein the determining the correlation between the URI prefix and the API name comprises determining a correlation between one or more API tokens of the API tokens and one or more URI-prefix tokens of the URI-prefix tokens.

7. The method of claim 6, wherein the determining the correlation between the one or more API tokens of the API tokens and one or more URI-prefix tokens of the URI-prefix tokens is based on one or more common token considerations including: a number of common tokens between the API tokens and the URI-prefix tokens, a number of consecutive common tokens between the API tokens and the URI-prefix tokens and a number of differences between one or more of the API tokens and one or more of the URI-prefix tokens.

8. The method of claim 1, wherein the determining that the URI prefix is associated with the particular API based on the correlation is in response to determining that a number of differences between the URI prefix and the API name is below a threshold.

9. The method of claim 1, wherein the identifying of the URI prefix comprises:
obtaining the first URI;
obtaining the second URI;
obtaining a potential URI prefix by removing a segment of the first URI; and
identifying the URI prefix based on the potential URI prefix being include in the second URI.

10. The method of claim 1, wherein prior to associating the first document with the particular API, the first document was associated with another API, and the associating of the first document with the particular API comprises disassociating the first document and the other API.

11. At least one non-transitory computer-readable media configured to store one or more instructions that when executed by at least one processor cause or direct a system to perform operations, the operations comprising:
obtaining a first document associated with a particular Application Programming Interface (API) and a first Uniform Resource Identifier (URI);
obtaining a second document associated with the particular API and a second URI;
identifying a URI prefix included in the first URI and the second URI;
obtaining an API name of the particular API;
determining a correlation between the URI prefix and the API name;
based on the correlation, determining that the URI prefix is associated with the particular API; and
associating the first document and the second document with the particular API based on the first URI and the second URI including the URI prefix and based on determining that the URI prefix is associated with the particular API.

12. The non-transitory computer-readable media of claim 11, the operations further comprising:
obtaining a third document associated with a third URI; and
associating the third document with the particular API based on the third URI including the URI prefix and based on the URI prefix being associated with the particular API.

13. The non-transitory computer-readable media of claim 11, wherein the particular API is a first API, the API name is a first API name, and the URI prefix is a first URI prefix; the operations further comprising:

obtaining a third document associated with a second API and a third URI;

obtaining a fourth document associated with the second API and a fourth URI;

identifying a second URI prefix included in the third URI and the fourth URI;

obtaining a second API name of the second API;

comparing the second API name to the first URI prefix and the second URI prefix;

determining, based on the comparison between the second API name and the first URI prefix, a first correlation between the second API name and the first URI prefix;

determining, based on the comparison between the second API name and the second URI prefix, a second correlation between the second API name and second URI prefix;

based on the first correlation and the second correlation, determining that the second URI prefix is associated with the second API and that the first URI prefix is not associated with the second API; and associating the third document and the fourth document with the second API based on the third URI and the fourth URI including the second URI prefix and based on determining that the second URI prefix is associated with the second API.

14. The non-transitory computer-readable media of claim 13, the operations further comprising:

obtaining a plurality of URI prefixes including a third URI prefix included in the first URI prefix and the second URI prefix;

comparing a third API name to one or more URI prefixes of the plurality of URI prefixes; and determining not to use the third URI prefix when comparing the third API name to the one or more URI prefixes of the plurality of URI prefixes based on the third URI prefix being included in the first URI prefix, which is associated with the first API, and the third URI prefix being included in the second URI prefix, which is associated with the second API.

15. The non-transitory computer-readable media of claim 11, wherein the URI prefix is a first URI prefix; the operations further comprising:

obtaining a plurality of URIs, wherein the first URI prefix is included in a first number of URIs of the plurality of URIs;

obtaining a second URI prefix included in a second number of URIs of the plurality of URIs; and wherein the determining the correlation between the API name and the first URI prefix comprises prioritizing comparing the API name to the first URI prefix or the second URI prefix based on the first number and the second number.

16. The non-transitory computer-readable media of claim 11, the operations further comprising:

obtaining API tokens representing the API name; and obtaining URI-prefix tokens representing the URI prefix; and wherein the determining the correlation between the URI prefix and the API name comprises determining a correlation between one or more API tokens of the API tokens and one or more URI-prefix tokens of the URI-prefix tokens.

17. The non-transitory computer-readable media of claim 11, wherein the determining the correlation between the one or more API tokens of the API tokens and one or more URI-prefix tokens of the URI-prefix tokens is based on one or more common token considerations including: a number of common tokens between the API tokens and the URI-prefix tokens, a number of consecutive common tokens between the API tokens and the URI-prefix tokens and a number of differences between one or more of the API tokens and one or more of the URI-prefix tokens.

18. The non-transitory computer-readable media of claim 11, wherein the determining that the URI prefix is associated with the particular API based on the correlation is in response to determining that a number of differences between the URI prefix and the API name is below a threshold.

19. The non-transitory computer-readable media of claim 11, wherein the identifying of the URI prefix comprises:

obtaining the first URI;

obtaining the second URI;

obtaining a potential URI prefix by removing a segment of the first URI; and identifying the URI prefix based on the potential URI prefix being include in the second URI.

20. The non-transitory computer-readable media of claim 11, wherein prior to the associating the first document with the particular API, the first document was associated with another API, and the associating of the first document with the particular API comprises disassociating the first document and the other API.

* * * * *